(12) United States Patent
Wu

(10) Patent No.: US 7,032,416 B1
(45) Date of Patent: Apr. 25, 2006

(54) TIRE LOCK

(76) Inventor: Chun-Hsien Wu, No. 717, Sec. 1, An Zhong Rd., Tainan (TW)

( * ) Notice: Subject to any disclaimer, the term of this patent is extended or adjusted under 35 U.S.C. 154(b) by 0 days.

(21) Appl. No.: 11/046,807

(22) Filed: Feb. 1, 2005

(51) Int. Cl.
*B60R 25/00* (2006.01)

(52) U.S. Cl. .......................................... 70/19; 70/226
(58) Field of Classification Search .................... 70/19, 70/225, 226, 14, 18, 209, 259, 260; 188/32
See application file for complete search history.

(56) References Cited

U.S. PATENT DOCUMENTS

| | | | | |
|---|---|---|---|---|
| 683,286 A * | 9/1901 | Houser | ............................ | 70/37 |
| 1,293,109 A * | 2/1919 | Kaplan | ............................ | 70/19 |
| RE24,712 E * | 10/1959 | Marugg | ........................ | 70/225 |
| 2,960,857 A * | 11/1960 | Winter | ............................ | 70/19 |
| 3,828,590 A * | 8/1974 | Thiebault | ........................ | 70/19 |
| 4,003,227 A * | 1/1977 | Casey | ............................ | 70/14 |
| 4,441,586 A * | 4/1984 | Bernier | .......................... | 188/32 |
| 4,651,849 A * | 3/1987 | Givati | .......................... | 180/287 |
| 4,723,426 A * | 2/1988 | Beaudoin | ........................ | 70/14 |
| 5,548,983 A * | 8/1996 | Hart | ............................. | 70/209 |
| 5,832,760 A * | 11/1998 | Firmin | .......................... | 70/226 |
| 6,408,658 B1 * | 6/2002 | Pickett | ............................ | 70/14 |
| 6,484,544 B1 * | 11/2002 | Wing | ............................ | 70/227 |
| 6,938,734 B1 * | 9/2005 | Curl | ............................. | 188/32 |
| 2005/0076685 A1* | 4/2005 | Vegvary | ........................ | 70/226 |

* cited by examiner

*Primary Examiner*—Lloyd A. Gall
(74) *Attorney, Agent, or Firm*—Rosenberg, Klein & Lee

(57) ABSTRACT

A tire lock includes a fixed arm, a lock tube, a movable arm and a lock rod. The movable arm is pivotally connected to the fixed arm at one end. Both the fixed arm and the movable arm comprise troughs, respectively. The lock tube is pivotally connected to the fixed arm. The lock rod is pivotally connected to the movable arm. The lock tube and the lock rod are respectively inserted through the troughs of the fixed arm and the movable arm, and have enlarged ends left outside of the troughs. By swinging the lock tube and the lock rod to engage together, the tire lock is locked on an opening of a tire.

1 Claim, 5 Drawing Sheets

TIRE LOCK

BACKGROUND OF THE INVENTION

1. Field of the Invention

This invention relates to a tire lock, and more particularly to a tire lock using with a fixed arm pivotally connected with a lock tube and a movable arm pivotally connected with a lock rod to lock a tire.

2. Description of the Prior Art

Car theft has becoming drivers' most nightmares, therefore, all kind of automobile locks have invented to protect their vehicles from theft. Steer wheel locks and tire locks are two of the most popular locks. The tire lock is one of the popular locks used by consumers due to its simple design and cheap price. A conventional tire lock, as shown in FIG. 5 comprises a fixed arm A and a movable arm B. The fixed arm A has a hollow tube A1 at the center portion and a lock means A2 close to the tube A1. The movable arm B comprises a rod B1 to be inserted into the hollow tube A1 and secured by the lock means A2. Thus an opening C1 of a tire C is secured by the fixed arm A and the movable arm B to prevent from rolling.

However, because the fixed arm A and the movable arm B are in a separate status when not in use, either one may be misplaced or missing. Further, to lock a tire, both the fixed arm A and the movable arm B must be aligned with each other to lock the tire. Any misalignment will cause the lock inappropriate or cannot be in a locking position.

SUMMARY OF THE INVENTION

It is the primary objective of the present invention to provide a tire lock, which is easy to operate.

It is another objective of the present invention to provide a tire lock, which is safe in use.

It is a further objective of the present invention to provide a tire lock, which is secure and easy to store.

DETAILED DESCRIPTION OF THE PREFERRED EMBODIMENT

Figure 1:
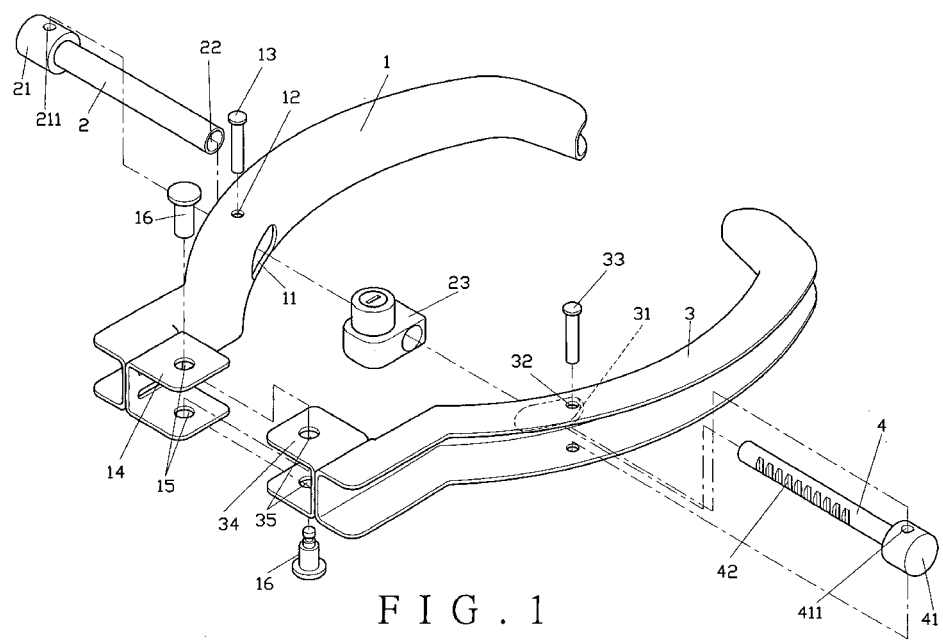
FIG. 1 is an exploded view of the present invention.
Figure 2:
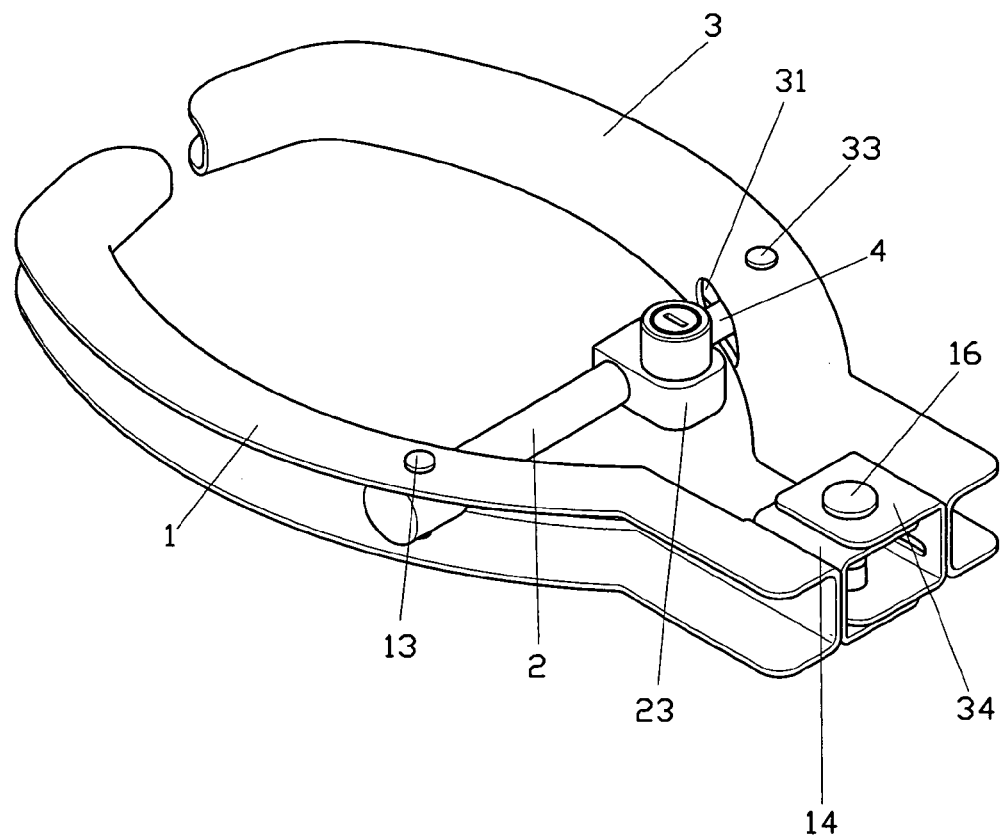
FIG. 2 is a perspective view of the present invention.

As shown in FIGS. 1 and 2, the present invention comprises a fixed arm 1, a lock tube 2, a movable arm 3 and a lock rod 4.

The fixed arm 1 has a longitudinal trough 11 at the center inner wall with a pair of connecting holes 12 at the top and bottom, respectively, to receive a fastener 13 therein. The fixed arm 1 further comprises a connecting section 14 at one end with a pair of connecting holes 15 thereon to receive a fastener 16 therein.

The lock tube 2 is pivotally connected to the trough 11 of the fixed arm 1. The lock tube 2 has an enlarged end 21 with a connecting hole 211 thereon. The outer diameter of the enlarged end 21 is larger than the width of the trough 11. The lock tube 2 is provided with a passage 22 at the other end. A lock means 23 is provided at the end opposing the enlarged end 21.

The movable arm 3 is pivotally connected to the connecting section 14 of the fixed arm 1. The movable arm 3 has a longitudinal trough 31 at the center inner wall with a pair of connecting holes 32 at the top and bottom, respectively, to receive a fastener 33 therein. The movable arm 3 further comprises a connecting section 34 at one end with a pair of connecting holes 35 thereon.

The lock rod 4 is pivotally connected to the trough 31 of the movable arm 3. The lock rod 4 has an enlarged end 41 with a connecting hole 411 thereon. The outer diameter of the enlarged end 41 is larger than the width of the trough 31. A series of saw troughs 42 are formed on the other end of the lock rod 4 to be inserted into the passage 22 of the lock tube 2, and secured by the lock means 23.

To assemble the present invention, as shown in FIG. 2, the lock tube 2 and the lock rod 4 are inserted through the troughs 11 and 31 of the fixed arm 1 and the movable arm 3, respectively. Both the lock tube 2 and the took rod 4 have the enlarged ends 21 and 41 left outside of the troughs 11 and 31. The connecting holes 211 and 411 of the lock tube 2 and the lock rod 4 are aligned with the connecting holes 12 and 32 of the fixed arm 1 and the movable arm 3, respectively. The fasteners 13 and 33 are inserted through the connecting holes 12, 32, 211 and 411 to connect the lock tube 2 and the lock rod 4 to the fixed arm 1 and the movable arm 3, respectively. The design of the troughs 11 and 31 is in a longitudinal shape, which allows the lock tube 2 and the look rod 4 to make a slight swing within the troughs 11 and 31. The connecting section 14 of the fixed arm 1 is aligned with the connecting section 34 of the movable arm 3. The fastener 16 is inserted into the connecting holes 15 and 35 of the fixed arm 1 and the movable arm 3 in such a manner that enables the movable arm 3 to swing accordingly.

Figure 3:
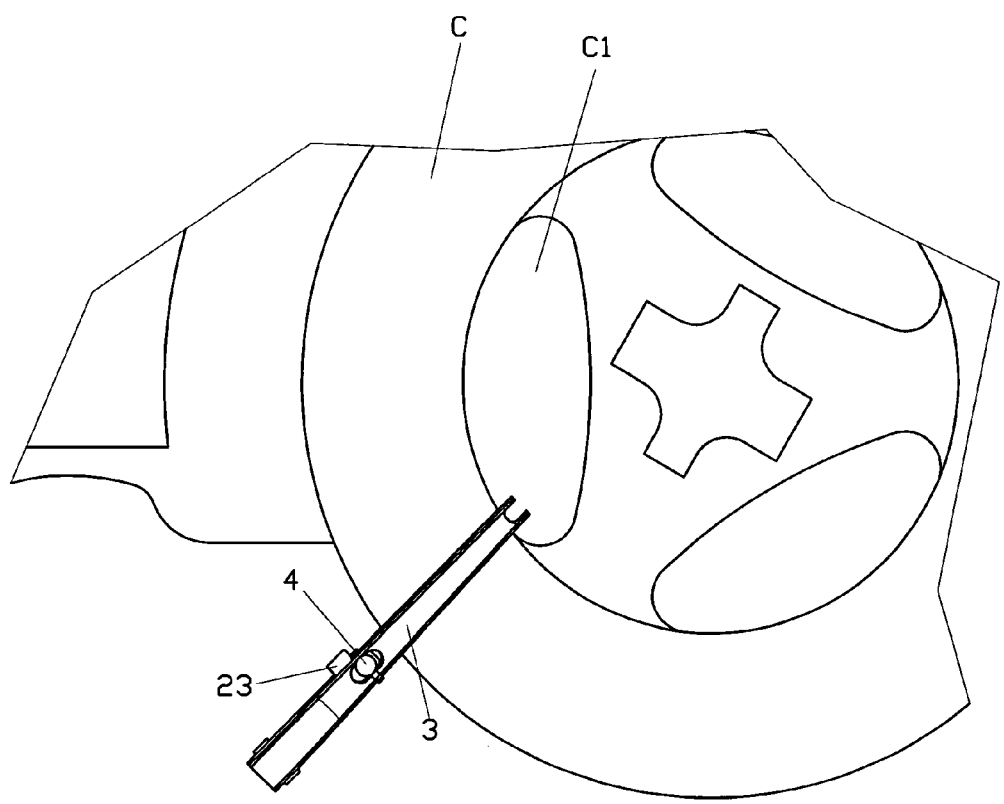
FIG. 3 is a side view showing that the present invention is applied to a tire.
Figure 4:
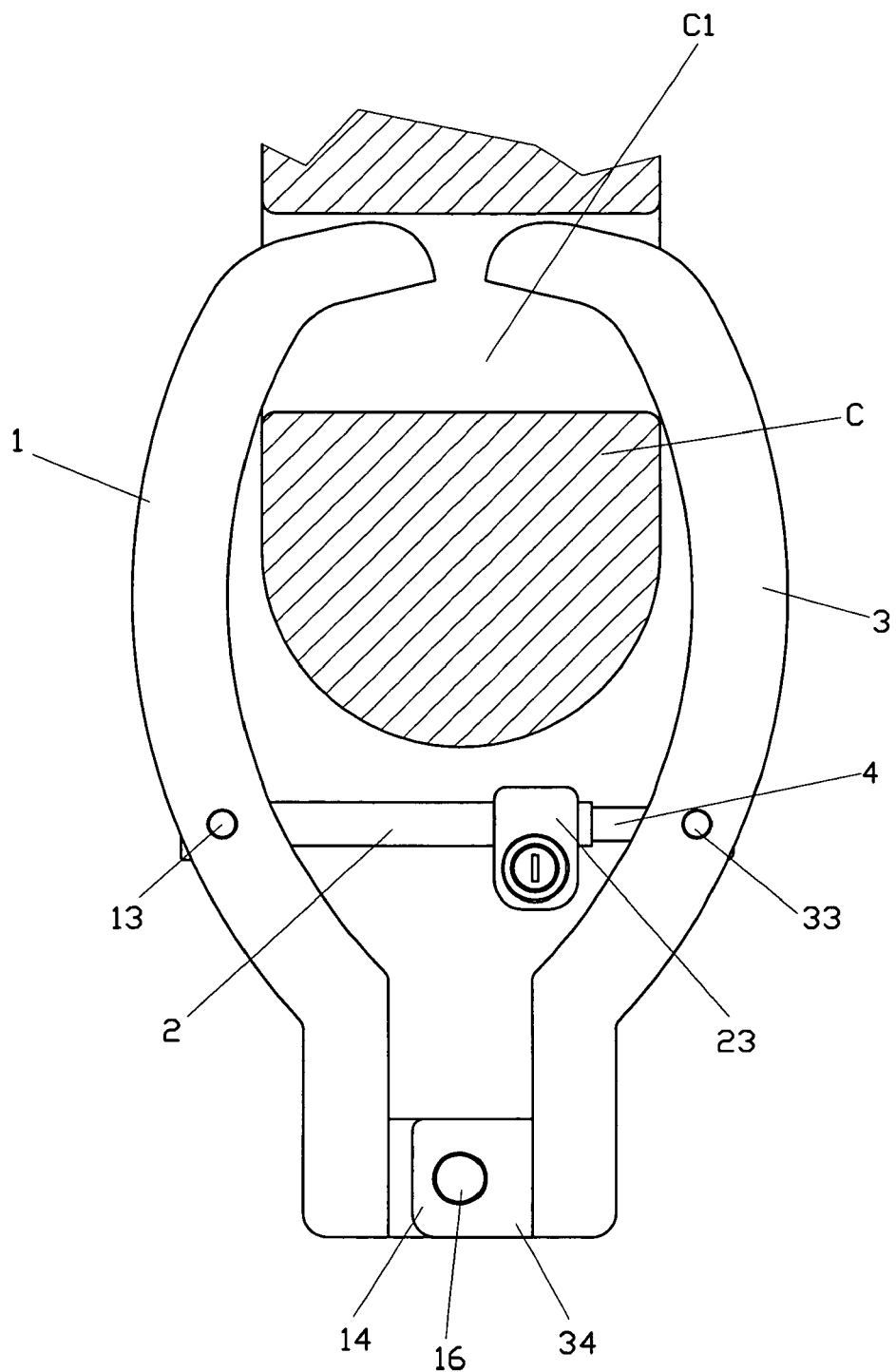
FIG. 4 is a top view of FIG. 3, partially sectioned.
Figure 5:
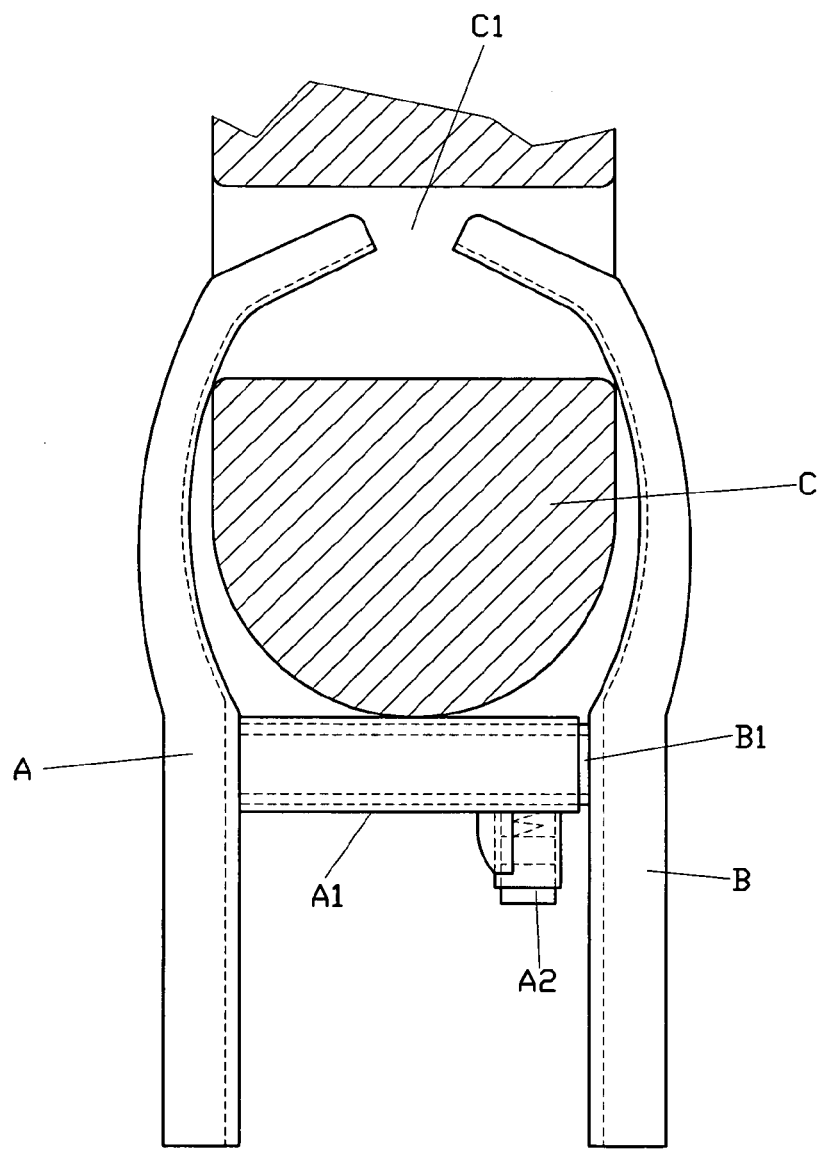
FIG. 5 is a top sectional view of a prior art.

To operate the present invention, as shown in FIG. 3, the movable arm 3 is swung with respect to the fixed arm 1 to open a space. The fixed arm 1 and the movable arm 3 are respectively inserted through an opening C1 of a tire C, and then the movable arm 3 is swung toward the fixed arm 1. The lock tube 2 and the lock rod 4 can be slightly adjusted within the troughs 11 and 31, so that the lock rod 4 is quickly inserted into the lock tube 2 and locked by the lock means 23 to secure the tire lock at place, as shown in FIG. 4. When a car thief starts the engine to drive the car, the tire lock will prevent the tire from rolling. Even though the thief breaks the fasteners 13 and 33, the enlarged ends 21 and 41 of the lock tube 2 and the lock rod 4 will prevent the fixed arm 1 and the movable arm 3 from detachment through the troughs 11 and 31. The fixed arm 1, the movable arm 3, the lock tube 2 and the lock rod 4 are still in a locked status. Thus the car is still in protection.

I claim:

1. A tire lock comprising:

a fixed arm having a U-shaped contour defined by top and bottom walls joined by an inner wall therebetween, said fixed arm having a first connecting section at one end thereof and a first slotted opening formed through said inner wall at a location spaced from said one end thereof;

a lock tube having a tubular body with an axially directed passage extending from a first end thereof and an enlarged connecting portion formed on an opposing second end, said enlarged connecting portion having an outer diameter that is larger than a width of said first slotted opening, said tubular body extending through said first slotted opening and said enlarged connecting portion being pivotally connected to said top and bottom walls of said fixed arm;

a lock mechanism affixed to said first end of said tubular body of said lock tube;

a movable arm having a U-shaped contour defined by top and bottom walls joined by an inner wall therebetween, said movable arm having a second connecting section at one end thereof pivotally connected to said first connecting section of said fixed arm, said movable arm having a second slotted opening formed through said inner wall thereof at a location spaced from said one end of said movable arm;

a lock rod having an axially extended body with a plurality of axially spaced saw troughs formed therein and an enlarged connecting portion on a proximal end thereof, said enlarged connecting portion having an outer diameter that is larger than a width of said second slotted opening, said body of said lock rod extending through said second slotted opening and said enlarged connecting portion thereof being pivotally connected to said top and bottom walls of said movable arm, said body of said look rod being passed through an opening in said lock mechanism to be received in said passage of said look tube, said lock mechanism being lockingly engaged with a selected one of said saw troughs to secure said movable arm to said fixed arm.

* * * * *